L. GREENBAUM & L. F. WINTER.
Ash-Can Receptacles.

No. 153,765. Patented Aug. 4, 1874.

WITNESSES:
E. Wolff
Alex F. Roberts

INVENTOR:
L. Greenbaum
L. F. Winter
BY
Munn
ATTORNEYS.

UNITED STATES PATENT OFFICE.

LOUIS GREENBAUM AND LOUIS F. WINTER, OF NEW YORK, N. Y.

IMPROVEMENT IN ASH-CAN RECEPTACLES.

Specification forming part of Letters Patent No. 153,765, dated August 4, 1874; application filed May 23, 1874.

*To all whom it may concern:*

Figure 1:
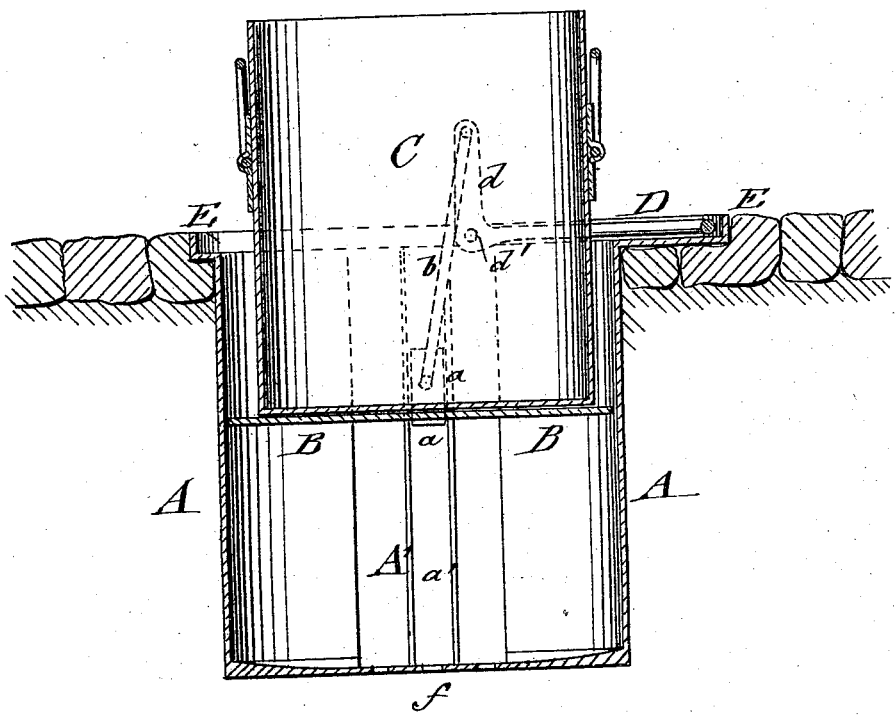
Figure 2:
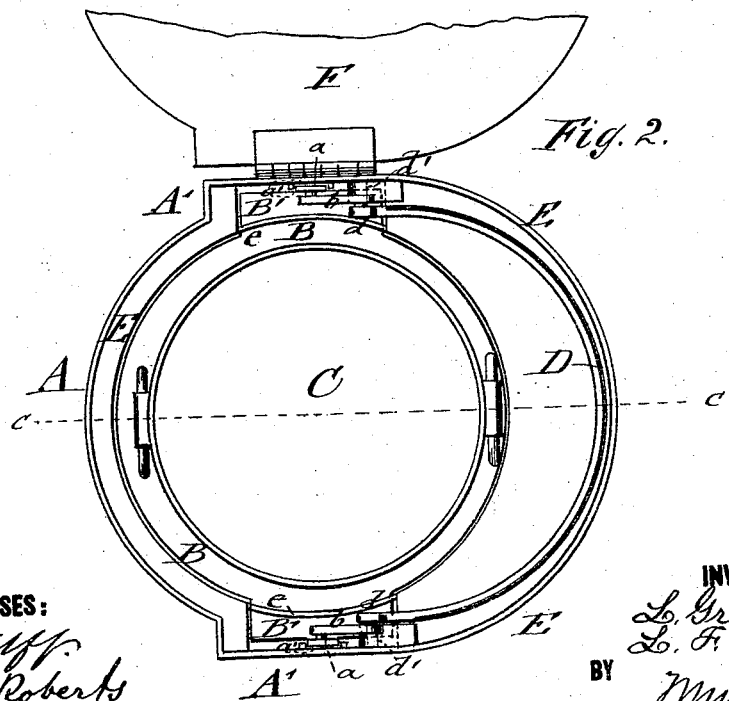

Be it known that we, LOUIS GREENBAUM and LOUIS F. WINTER, of the city, county, and State of New York, have invented a new and Improved Ash-Can Receptacle, of which the following is a specification:

In the accompanying drawing, Figure 1 represents a vertical central section of our improved ash-can receptacle, taken on the line *c c*, Fig. 2; and Fig. 2, a top view of the same, with lid thrown open for taking out and emptying ash-can.

Similar letters of reference indicate corresponding parts.

The object of our invention is to provide a receptacle for ash-cans by which they may be placed entirely out of the way and the ill-looking and smelling contents hidden out of sight, while admitting at the same time the ready and easy removal of the contents with hardly any additional trouble. Our invention consists of a cylindrical or other receptacle, which is placed below the level of the pavement and arranged with a false sliding bottom for the ash-can, to be raised and lowered by a swinging bail with suitable lever connections. The receptacle and ash-can is closed by a hinged lid at the level of the pavement.

In the drawing, A represents a cylindrical, oval, or otherwise shaped receptacle, made of sheet or cast iron, or any other suitable material. A false bottom, B, slides, by means of diametrical side extensions or ears B', in corresponding side extension-chambers A' of receptacle A, being guided therein by vertical slide-pieces *a*, running in central grooves *a'* of side chambers A'. The ash-can C is placed on the false bottom B, and raised and lowered therewith, as required. The raising and lowering of the false bottom is accomplished by lever-rods *b*, which are pivoted to the vertical slide-pieces *a* and the ends of elbow-levers *d* of a bail, D, which is fulcrumed at the vertex *d'* of the rectangles formed with levers *d* to the upper part of the receptacle A at one side of the extension-chambers of the same, so that elbow-levers *d* and connecting-rods *b* may readily swing in the space formed by the same. Bail D rests in a circumferential flanged-top extension, E, of receptacle A, which is at that side to which the bail is pivoted of sufficient length to allow the full swinging over of the bail from one side of the receptacle to the other and the retention of false bottom and ash-can in raised position at a distance equal to twice the length of the elbow-levers. The upper part of the side extension-chambers A' above the raised position of the false bottom B is preferably closed by connecting partition-walls *e*, which serve also for the purpose of defining the extent of upward motion of the false bottom. The ash-can receptacle, with bail-extension E, is completely closed by a hinged cover or lid, F, of suitable construction, which may be closed in such a manner as to permit the opening of the receptacle only to the person who places the filled ash-tub therein and to the driver who carts the contents away. The handles of the ash-tub are hinged sidewise at such height that they are above the top of the receptacle when in raised position so as to be conveniently handled. The bottom of the receptacle is concaved or inclined toward the center, and provided with exit-holes *f* for carrying off any water or other moisture which may perchance enter into the interior of the receptacle. The ash-can receptacle being sunk into the ground on a level with the pavement carries the unsightly ash-can entirely out of the way, prevents the exhalation of any disagreeable odors, and forms a very convenient, neat, and practical mode of storing away and emptying ash-cans in cities.

Having thus described our invention, we claim as new and desire to secure by Letters Patent—

1. The combination, with receptacle A, having side extensions A', of the loose movable bottom B, having tenoned side extensions B', as and for the purpose specified.

2. The false bottom provided with extension-ears guided in the side chambers of the receptacle, in combination with pivoted lever-rods and swinging bail, for raising and lowering the false bottom, substantially as specified.

3. The incasing-receptacle A, having side extension-chambers with guide-grooves for the false bottom, and top extension at the upper part for the swinging bail, substantially as set forth.

LOUIS GREENBAUM.
LOUIS F. WINTER.

Witnesses:
T. B. MOSHER,
ALEX. F. ROBERTS.